United States Patent [19]

Masuda et al.

[11] 4,365,476
[45] Dec. 28, 1982

[54] CONDENSATION SYSTEM FOR POWER PLANT

[75] Inventors: Toyohiko Masuda; Takeshi Ueno; Yoji Nagai; Hitoshi Ishimaru, all of Hitachi; Shozo Nakamura, Hitachiota, all of Japan

[73] Assignees: Hitachi Ltd.; Hitachi Engineering Co. Ltd., both of Tokyo, Japan

[21] Appl. No.: 199,667

[22] Filed: Oct. 22, 1980

[30] Foreign Application Priority Data

Oct. 23, 1979 [JP] Japan .............................. 54-135967

[51] Int. Cl.³ .................................................. F22D 5/00
[52] U.S. Cl. ........................................ 60/686; 60/657
[58] Field of Search ................ 60/646, 657, 685, 686

[56] References Cited

U.S. PATENT DOCUMENTS 4,055,048 10/1977 Reed ................................. 60/657 X
4,099,384 7/1978 Stevens et al. ................... 60/646 X

*Primary Examiner*—Allen M. Ostrager
*Assistant Examiner*—Stephen F. Husar
*Attorney, Agent, or Firm*—Antonelli, Terry and Wands

[57] ABSTRACT

Condensation system for use in a power plant. The condensate system includes side stream condenser defining therein first and second hot wells. Condensate is delivered from the first to second hot well through a condensate feed line. Condensate is introduced from the condensate feed line into a tank through a first spill-over line. Condensate is supplied from the second hot well to the power plant through a main condensate feed line. Condensate is introduced from the main condensate feed line into the tank through a second spill-over line. Actuator is operative in response to signal from a level detector detecting level of condensate in the first hot well, to regulate opening degree of a supplementary feed valve in the supplementary feed line, to close one of first and second spill-over valves in the first and second spill-over lines, respectively, and to open the other spill-over valve.

18 Claims, 4 Drawing Figures

CONDENSATION SYSTEM FOR POWER PLANT

BACKGROUND OF THE INVENTION

1. Field of the Invention

The present invention relates to a condensation system for use in a power plant including a steam generator and a steam turbine, and more particularly to a condensation system comprising a side stream condenser defining therein first and second hot wells with the first hot well receiving therein condensate produced by condensing steam exhausted from the steam turbine.

2. Description of Prior Art

A conventional condensation system of the kind described above comprises a condensate purification system which includes a condensate feed line through which condensate is fed from the first hot well to the second hot well, a condensate pump in the condensate feed line, a condensate purifying apparatus provided in the condensate feed line at a location downstream of the condensate pump for removing impurities from the condensate and subjecting thereto a PH control, and a return line having one end thereof connected to the first hot well and the other end connected through a first flow control valve to the condensate feed line at a location downstream of the condensate purifying apparatus. A second flow control valve is provided in a branch line which has one end thereof connected to the condensate feed line at a location downstream of the location where the other end of the return line is connected to the condensate feed line and the other end connected to the return line at a location downstream of the first flow control valve.

The conventional condensation system further comprises a supplementary feed system which includes a condensate tank, a supplementary feed line communicating the tank and the first hot well with each other, a supplementary feed valve provided in the supplementary feed line for controlling flow rate of condensate supplied from the tank into the first hot well, a spill-over line having one end thereof connected to the tank and the other end connected to a main condensate feed line of a main feed system, and a spill-over valve provided in the spill-over line for controlling flow rate of condensate introduced from the main condensate feed line into the tank. Condensate is supplied from the second hot well to the steam generator through the main condensate feed line.

Control system for the condensing system includes a first level detector for detecting level of condensate in the first hot well to produce a signal, a second level detector for detecting level of condensate in the second hot well to produce a signal, a first actuator operative in response to the signal from the first detector to actuate the first and second flow control valves so as to regulate the respective opening degrees thereof, and a second actuator operative in response to the signal from the second level detector to actuate the supplementary feed valve and the spill-over valve so as to regulate the respective opening degrees thereof.

With such arrangement of the conventional condensation system, a signal which indicates change in level of condensate in the first hot well is introduced from the first level detector into the first and second flow control valves to adjust the rate of flow rate of condensate returned into the first hot well to flow rate of condenate fed into the second hot well. In addition, a signal which indicates change in level of condensate in the second hot well is introduced from the second level detector into the supplementary feed valve to regulate flow rate of condensate supplied from the tank to the first hot well. Thus, the level of condensate in the first hot well is controlled by the regulation of flow rate of condensate returned into the first hot well through the return line and the regulation of flow rate of condensate supplied to the first hot well through the supplementary feed line.

However, the change in flow rate of condensate returned into the first hot well through the return line causes flow rate of condensate introduced to the second hot well through the condensate feed line to be changed. Accordingly, the control of level of condensate in the first hot well affects the level of condensate in the second hot well. In addition, since the level of condensate in the first hot well is also controlled by the supplementary feed valve which is actuated in response to the signal from the second level detector, responsibility of control of level of condensate in the first hot well is low.

Furthermore, the signal from the second level detector is also introduced into the first and second flow control valves to adjust the rate of flow rate of condensate returned into the first hot well to flow rate of condensate fed into the second hot well. The signal from the second level detector is introduced into the spill-over valve to regulate flow rate of condensate introduced from the main condensate line to the tank through the spill-over line. Thus, the level of condensate in the second hot well is controlled by the regulation of flow rate of condensate supplied into the second hot well through the condensation feed line and the regulation of flow rate of condensation introduced from the main condensate line to the tank through the spill-over line. However, the change in flow rate of condensate supplied to the second hot well through the condensate feed line causes flow rate of condensate returned into the first hot well through the return line to be changed. Accordingly, control of level of condensate in the second hot well affects the level of condensate in the first hot well.

Furthermore, in the conventional condensation system, halt or unactivation of the main condensate pump makes it impossible to control the level of condensate in the second hot well, because the condensate is no longer introduced from the main feed line to the tank through the spill-over line.

SUMMARY OF THE INVENTION

An object of the present invention is to provide a condensation system in which control of level of condensation in the first hot well does not affect change in flow rate of condensate supplied to the second hot well through the condensate feed line thereby to improve reliability of the condensation system.

An another object of the present invention is to provide a condensation system which has no interference of control of condensate level in the first hot well and control of condensate level in the second hot well with each other to further improve reliability of the condensation system.

Still another object of the present invention is to provide a condensation system in which sufficient quantity of condensate is supplied from the second hot well to the tank, when the condensate pump starts its operation and/or inadvertently decreases in capacity.

Further object of the present invention is to provide a condensation system in which condensate level in the second hot well can be controlled, even during unactivation of the main condensate pump.

Still further object of the present invention is to provide a condensation system in which sufficiently purified condensate can be introduced from the condensate feed line into the tank, even when a great amount of cooling sea-water is inadvertently introduced into the first hot well.

Further object of the present invention is to provide a condensation system which requires no second level detector detecting condensate level in the second hot well.

Still further object of the present invention is to provide a condensation system which enables a condensate pump to have relatively low capacity.

According to the present invention, there is provided a condensation system for use in a power plant including a steam generator and a steam turbine, comprising: a side stream condenser defining therein first and second hot wells, the first hot well receiving therein condensate produced by condensing steam exhausted from the steam turbine; a condensate purification system including a condensate feed line through which condensate is fed them the first hot well to the second hot well, and means provided in the condensate feed line for purifying condensate flowing therethrough; a main feed system including a main condensate line through which condensate is fed from the second hot well to the steam generator; a supplementary feed system including a condensate tank, a supplementary feed line having one end thereof connected to the tank and the other end connected to the first hot well, a supplementary feed valve provided in the supplementary feed line for controlling flow rate of condensate from the tank to the first hot well, a first spill-over line having one end thereof connected to the tank and the other end connected to the condensate feed line, a first spill-over valve provided in the first spill-over line for controlling flow rate of condensate from the condensate feed line to the tank, a second spill-over line having one end thereof connected to the tank and the other end connected to the main condensate feed line for controlling flow rate of condensate from the main condensate feed line to the tank; and a control system including level detecting means for detecting level of condensate in the first hot well to produce a signal, and actuating means operative in response to the signal from the level detecting means to actuate the supplementary feed valve and the first and second spill-over valves so as to regulate the opening degree of the supplementary feed valve, so as to open one of the first and second spill-over valves to regulate the opening degree thereof, and so as to close the other spill-over valve.

DETAILED DESCRIPTION OF THE PRIOR ART (FIG. 1)

Prior to description of the preferred embodiments of the present invention, a conventional condensation system discussed previously will be described with reference to FIG. 1 in more detailed manner to facilitate understanding of feature and arrangement of the present invention.

Figure 1:
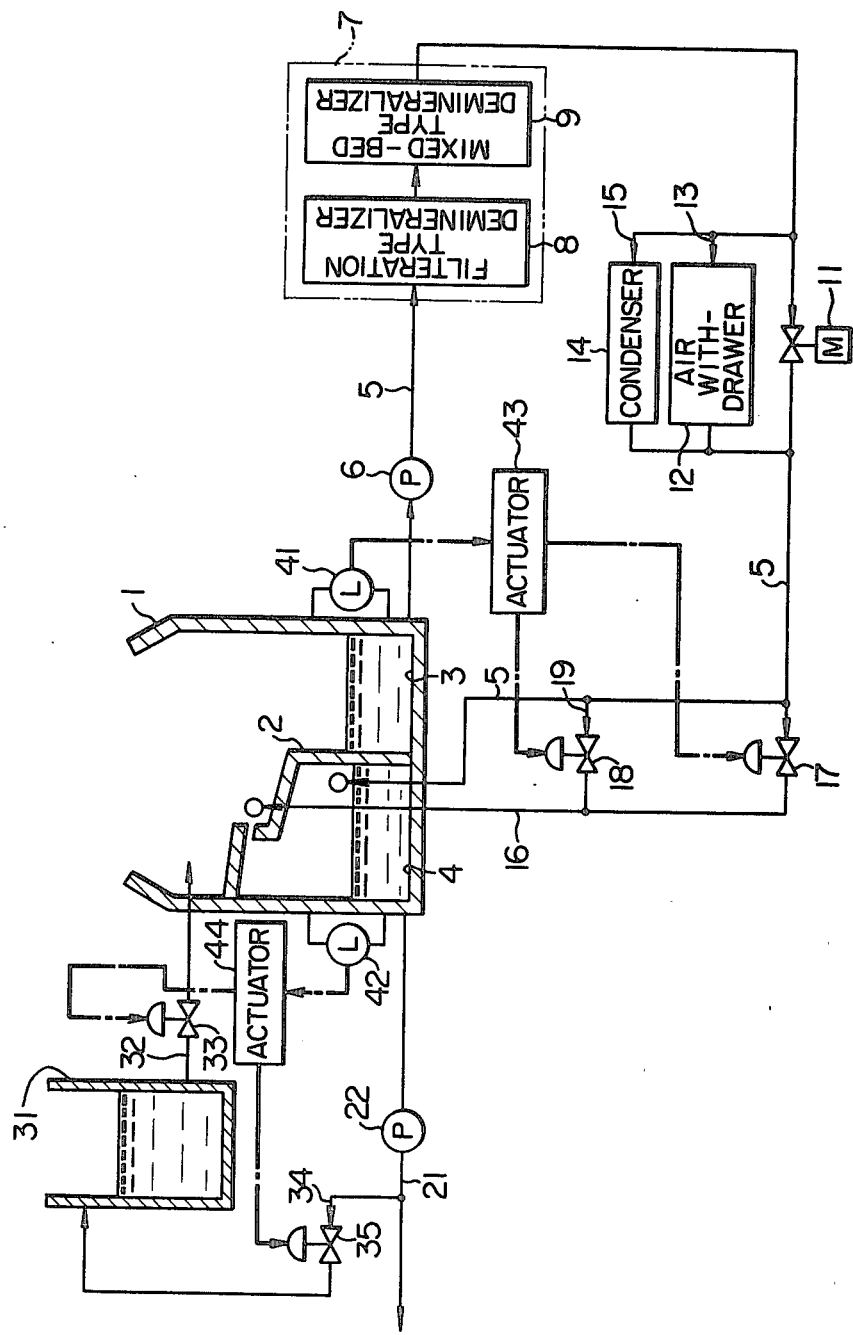
FIG. 1 is a schematic view illustrating a conventional condensation system.

Referring to FIG. 1, a conventional condensation system for use in a power plant which includes a steam generator and a steam turbine comprises a side stream condenser 1, a condensate purification system, a main feed system, a supplementary feed system and a control system. The side stream condenser 1 has a partition wall 2 to define first and second hot wells 3 and 4 in the condenser. The first hot well 3 receives therein condensate produced by condensing steam exhausted from the steam turbine of the power plant.

The condensate purification system includes a condensate feed line 5 having one end thereof connected to the first hot well 3 and the other end connected to the second hot well 4, a condensate pump 6 in the feed line to pump the condensate from the first hot well to the second hot well 4 at a constant flow rate, independently of operating conditions of the power plant, and condensate purifying apparatus 7 provided in the feed line 5 for removing impurities from condensate and subjecting thereto a PH control. The condensate purifying apparatus 7 includes a filteration type demineralizer 8 and a mixed-bed type demineralizer 9 connected thereto in series and downstream thereof. A motor-actuated valve 11 is provided in the condensate feed line 5 at a location downstream of the condensate purifying apparatus 7. A gland steam condenser 14 is provided in a bypass line 15 bypassing the valve 11, for condensing steam enclosed within gland portions of the steam turbine and valve. An air withdrawer 12 is also provided in a second bypass line 13 bypassing the gland steam condenser 14 and the valve 11, for condensing steam which is utilized to actuate a not shown steam ejector so as to withdraw incondensable gas out of the side stream condenser 1. A return line 16 has one end thereof connected to the first hot well 3 and the other end connected through a first flow control valve 17 to the condensate feed line 5 at a location downstream of the valve 11. A second flow valve 18 is provided in a branch line 19 which has one end thereof connected to the condensate feed line 5 at a location where the other end of the return line 16 is connected to the condensate feed line 5 and the other end connected to the return line 16 at a location downstream of the first flow control valve 17.

The main feed system includes a main condensate feed line 21 having one end thereof connected to the second hot well 4 and the other end connected to the steam generator, and a main condensate pump 22 for pumping condensate from the second hot well 4 to the steam generator.

The supplementary feed system includes a tank 31, a supplementary feed line 32 having one end thereof connected to the tank and the other end connected to the first hot well 3, a supplementary feed valve 33 provided in the line 32 for controlling flow rate of condensate supplied from the tank 31 to the first hot well 3, a spill-over line 34 having one end thereof connected to the tank 31 and the other end connected to the main condensate feed line 21 at a location downstream of the main condensate pump 22, and a spill-over valve 35 provided in the spill-over line 34 for regulating flow rate of condensate introduced from the main condensate feed line 21 into the tank 31.

The control system includes a first level detector 41 for detecting level of condensate in the first hot well 3 to produce a signal, a second level detector 42 for detecting level of condensate in the second hot well 4 to produce a signal, a first actuator 43 operative in response to the signal from the first level detector 41 to actuate the first and second flow control valve 17 and 18 so as to regulate the respective opening degrees thereof, and a second actuator 44 operative in response to the signal from the second level detector 42 to actuate the supplementary feed valve 33 and the spill-over valve 35 so as to adjust the respective opening degrees thereof.

The condensate in the first hot well 3 is pumped through the feed line 5 into the purification apparatus 7 by the condensate pump 6 and is treated by the purification apparatus 7. A quantity of the treated condensate determined by the valve 11 flows into the condenser 14 and withdrawer 12 and is heated due to heat-exchange by means thereof. A portion of the heated condensate is introduced into the second hot well 4 through the feed line 5, and the remaining portion of the heated condensate is returned into the first hot well 3 through the return line 16. The rate of the flow rate of condensate introduced into the second hot well 4 to the flow rate of condensate returned to the first hot well 3 is determined by the opening degree of each of the first and second flow control valves 17 and 18.

The condensate in the second hot well 4 is pumped by the main condensate pump 22 to the steam generator. A portion of the condensate is introduced through the spill-over line 34 into the tank 31. The condensate in the tank 31 is fed to the first hot well 3 through the supplementary feed line 32.

With such arrangement of the conventional condensation system, a signal which indicates change in level of condensate in the first hot well 3 is introduced from the first level detector 41 into the first and second flow control valves 17 and 18 to adjust the rate of flow rate of condensate returned into the first hot well 3 to flow rate of condensate fed into the second hot well 4. In addition, a signal which indicates change in level of condensate in the second hot well 4 is introduced from the second level detector 42 into the supplementary feed valve 33 to regulate flow rate of condensate supplied from the tank 31 to the first hot well 3. Thus, the level of condensate in the first hot well 3 is controlled by the regulation of flow rate of condensate returned into the first hot well 3 through the return line 16 and the regulation of flow rate of condensate supplied to the first hot well 3 through the supplementary feed line 32.

Furthermore, the signal from the second level detector 42 is also introduced into the first and second flow control valves 17 and 18 to adjust the rate of flow rate of condensate returned into the first hot well 3 to flow rate of condensate fed into the second hot well 4. In addition, the signal from the second level detector 42 is introduced into the spill-over valve 35 to regulate flow rate of condensate supplied from the second hot well 4 to the tank 31 through the main condensate line 21. Thus, the level of condensate in the second hot well 4 is controlled by the regulation of flow rate of condensate supplied into the second hot well 4 through the condensation feed line 5 and the regulation of flow rate of condensation introduced from the main condensate feed line 21 to the tank 31 through the spill-over line 34.

The conventional condensation system is arranged as described with reference to FIG. 1 so that it has disadvantages discussed previously.

DETAILED DESCRIPTION OF THE PREFERRED EMBODIMENTS (FIGS. 2-4)

Figure 2:
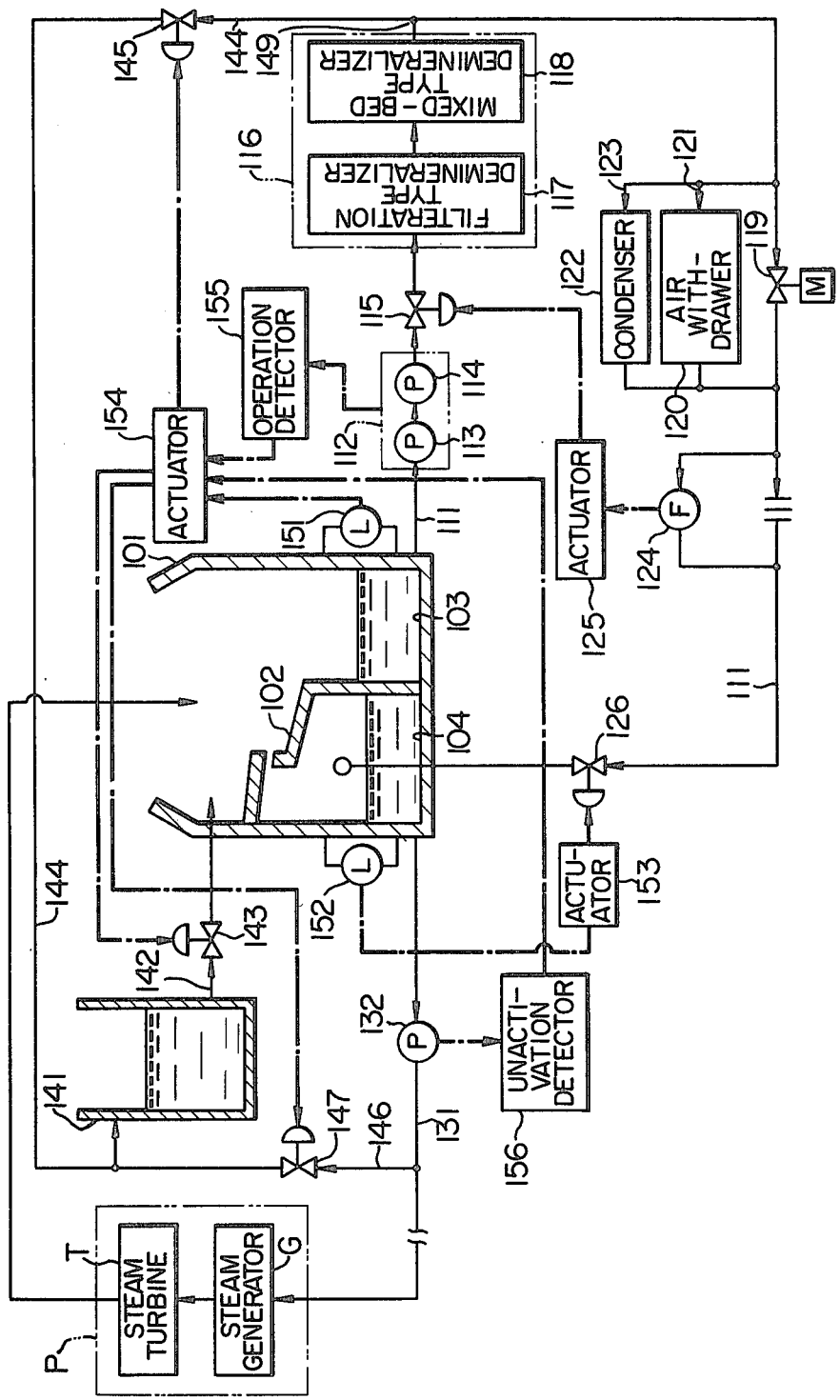
FIG. 2 is a schematic view of a condensation system according to the present invention.

Referring now to FIG. 2, there is shown a condensation system in accordance with the present invention, for use in a power plant P which includes a steam generator G and a steam turbine T. The condensation system illustrated in FIG. 2 comprises a side stream condenser 101 which has a partition wall 102 defining first and second hot wells 103 and 104 in the condenser 101. The first hot well 103 receives therein condensate produced by condensing steam exhausted from the steam turbine T. The condensation system further comprises a condensate purification system, a main feed system, a supplementary feed system, and a control system, which will be individually described hereinafter.

The condensate purification system includes a condensate feed line 111 having one end thereof connected to the first hot well 103 and the other end connected to the second hot well 104, and a condensate pumping apparatus 112 in the condensate feed line 111 for pumping condensate from the first hot well 103 to flow through the line 111 at a constant flow rate, regardless of operating condition of the power plant P. The pumping apparatus 112 may include a plurality of pumps 113, 114 connected in series. A first flow control valve 115 is provided in the condensate feed line 111 at a location downstream of the pumping apparatus 112. A condensate purifying apparatus 116 is provided in the condensate feed line 111 at a location downstream of the first flow control valve 115 for removing impurities from condensate and subjecting thereto a PH control. The condensate purifying apparatus 116 includes a filteration type demineralizer 117 and a mixed-bed type demineralizer 118 connected thereto in series and downstream thereof. A motor-actuated valve 119 is provided in the condensate feed line 111 at a location downstream of the purification apparatus 116. A gland steam condenser 122 is provided in a bypass line 123 bypassing the valve 119 for condensing steam enclosed within gland portions of the steam turbine T and valve. An air withdrawer 120 is also provided in a second bypass line 121 bypassing the gland steam condenser 122 and the valve 119 for condensing steam which is utilized to actuate a not shown steam ejector so as to withdraw incondensable gas out of the side stream condenser 101. A flow rate detector 124 detects flow rate of condensate flowing through the condensate feed line 111 at a location downstream of the valve 119 to produce a signal. An actuator 125 is operative in response to the signal from the flow rate detector 124 to actuate the first flow control valve 115 so as to regulate flow rate of condensate flowing into and through the purifying apparatus 116. A second flow control valve 126 is provided in the condensate feed line 111 at a location downstream of the flow rate detector 124 for controlling flow rate of condensate supplied into the second hot well 104.

The main feed system includes a main condensate feed line 131 having one end thereof connected to the second hot well 104 and the other end connected to the steam generator G, and a main condensate pump 132 for pumping condensate from the second hot well 104 to the steam generator. Condensate in the second hot well 104 is pumped by the main condensate pump 132 through the main condensate feed line 131 in compliance with flow rate of condensate pumped by a not shown further pump into the power plant P in accordance with operating condition thereof.

The supplementary feed system includes a condensate tank 141, a supplementary feed line 142 having one end thereof connected to the tank and the other end connected to the first hot well 103, a supplementary feed valve 143 provided in the line 142 for controlling flow rate of condensate supplied from the tank 141 to the first hot well 103, a first spill-over line 144 having one end thereof connected to the tank 141 and the other end connected to the condensate feed line 111 at a location 149 downstream of the mixed-bed type demineralizer 118, and a first spill-over valve 145 provided in the first spill-over line 144 for controlling flow rate of condensate introduced from the condensate feed line 111 into the tank 141 through the first spill-over line 144. A second spill-over line 146 has one end thereof connected to the tank 141 and the other end connected to the main condensate feed line 131 at a location downstream of the main condensate line 132. A second spill-over valve 147 is provided in the second spill-over line 134 for regulating flow rate of condensate introduced from the main condensate line 131 into the tank 141 through the second spill-over line 146.

The control system includes a first level detector 151 for detecting level of condensate in the first hot well 103 to produce a signal, and a second level detector 152 for detecting level of condensate in the second hot well 104 to produce a signal. A first actuator 153 is operative in response to the signal from the second level detector 152 to actuate the second flow control valve 126 so as to regulate the opening degree thereof. A second actuator 154 receives the signal from the first level detector 151 and actuates in response to the signal to regulate the opening degree of the supplementary feed valve 143, to open one of the first and second spill-over valves 145 and 147 so as to adjust the opening degree thereof, and to close the other spill-over valve. The first spill-over valve 145 is normally opened and regulated in opening degree by the first control actuator 154. The second spill-over valve 147 is normally closed by the actuator 154. An operation detector 155 is associated with the pumping apparatus 112 for detecting the operating condition thereof to produce a signal when the pumping apparatus starts its operation and/or when power of the pumping apparatus decreases, for example, when one of the pumps 113, 114 fails. The signal from the operation detector 155 is introduced into the second actuator 154 to cause the same to actuate the first and second spill-over valves 145 and 147 so as to close the first spill-over valve 145 and so as to open the second spill-over valve 147 to regulate opening degree thereof.

An unactivation detector 156 is associated with the main condensate pump 132 for detecting activation and unactivation thereof to produce a signal when the pump 132 is unactivated. The signal from the unactivation detector 156 is transferred to the second detector 154 to cause the same to actuate the first and second spill-over valves 145 and 147 so as to close the second spill-over valve 147 and so as to open the first spill-over valve 145 to regulate opening degree thereof.

In operation, condensate in the first hot well 103 is delivered by the pumping apparatus 112 through the condensate feed line 111 to the condensate purifying apparatus 116 and is treated thereby. A quantity of the treated condensate determined by the valve 119 is introduced through the bypass lines 123 and 121 into the gland steam condenser 122 and the air withdrawer 120 where heat-exchange is conducted to elevate the temperature of the condensate. The heated condensate is fed through the condensate feed line 111 into the second hot well 104.

When the first level detector 151 produces a signal indicating that the level of condensate in the first hot well 103 is within a predetermined range, the signal from the first level detector 151 is introduced into the second actuator 154 to actuate the supplementary feed valve 143 so as to have substantially constant opening degree. At the same time, the second spill-over valve 147 is actuated by the second actuator 154 so as to be maintained closed. The first spill-over valve 145 is also actuated by the second actuator 154 so as to have substantially constant opening degree. A portion of condensate is constantly introduced from the condensate feed line 111 into the tank 141 through the first spill-over line 144, and the remaining portion of the condensate flows downstream of the location 149 through the condensate feed line 111.

When the first level detector 151 produces a signal indicating that the level of condensate in the first hot well 103 becomes higher or lower than the predetermined range, the signal from the first level detector 151 is introduced into the second actuator 154 to decrease or increase the opening degree of the supplementary feed valve 143, respectively. Thus, the flow rate of condensate supplied from the tank 141 to the first hot well 103 through the supplementary feed line 142 is decreased or increased so that the level of condensate in the first hot well 103 is controlled within a predetermined range. When the second actuator 154 receives the signal from the first level detector 151 indicating increase or decrease in level of condensate in the first hot well 103, the second actuator 154 maintains the second spill-over valve 147 closed and the first spill-over valve 145 opened so as to have a constant opening degree.

When the second level detector 152 produces a signal indicating change in level of condensate in the second hot well 104, the signal from the second level detector 152 is introduced into the first actuator 153 to regulate the opening degree of the flow control valve 126 so that the flow rate of condensate introduced into the second hot well 104 is adjusted. Thus, the level of condensate in the second hot well 104 is controlled within a predetermined range.

When the pumping apparatus 112 starts its operation and/or power of the pumping apparatus inadvertently decreases, the flow rate of condensate pumped by the pumping apparatus to flow through the condensate feed line 111 is low and the flow rate of condensate introduced into the tank 141 through the first spill-over line 144 will become insufficient. The signal from the operation detector 155 indicating that the pumping apparatus 112 starts its operation and/or the power thereof decreases is introduced into the first and second spill-over valves 145 and 147 to close the first spill-over valve 145 and to open the second spill-over valve 147 to ensure that sufficient amount of condensate is introduced into the tank 141 through the second spill-over line 146.

When the unactivation detector 156 produces a signal indicating unactivation of the main condensate pump 156, the signal from the unactivation detector 156 is introduced into the second actuator 154 to cause the same to actuate the first and second spill-over valves 145 and 147 so as to close the second spill-over valve 147 and so as to fully open the first spill-over valve 145. Thus, the condensate is recirculated through the condensate feed line 111, the first spill-over line 144, the tank 141 and the supplementary feed line 142, and the level of condensate in the first hot well 103 is maintained within a predetermined range. In addition, the level of condensate in the second hot well 104 is also maintained within a predetermined range.

As described above, in the present invention, level of condensate in the first hot well is controlled independently of control of level of condensate in the second hot well. In other words, the control of level of condensate in the first hot well does not affect level of condensate in the second hot well. Thus, reliability in level control is improved. In addition, the control of condensate in the second hot well does not also affect level of condensate in the first hot well. That is, the control of level of condensate in the first hot well and the control of level of condensate in the second hot well are independent from each other, i.e., does not interfere with each other. Accordingly, reliability in level control is further improved.

Further, even when the pumping apparatus 112 starts its operation and/or power thereof decreases, sufficient amount of condensate is introduced into the tank through the second spill-over line 146.

Furthermore, since the first spill-over valve 145 is opened during unactivation of the main condensate pump 132, condensate can be recirculated from and to the first hot well 103 through the condensate feed line 111, the first spill-over line 144, the tank 141 and the supplementary feed line 142, so that the condensate purification system can be operated completely regardless of operating condition of the main feed system. In other words, the condensate purification system can be independently operated, and level of condensate in the first hot well 103 can be controlled regardless of operating condition of the main feed system. In addition, since condensate is recirculated through the first hot well, it is possible to prevent corrosion from occurring on the first hot well wall. Additionally, since the condensate purification system can be independently operated, quantity and quality of feed water can be secured for use as feed water fed to heat-exchangers for cooling instruments and for use in other purposes, even during halt of the main feed system.

Additionally, since the level of condensate in the second hot well 104 is controlled by the flow control valve 126 actuated by the first actuator 153 which is in response to signal from the second level detector 152, great change in flow rate which will occur due to regenerating operation of the condensate purification apparatus 116 does not substantially affect flow rate of condensate supplied into the second hot well 104, so that stable operation is made possible.

Figure 3:
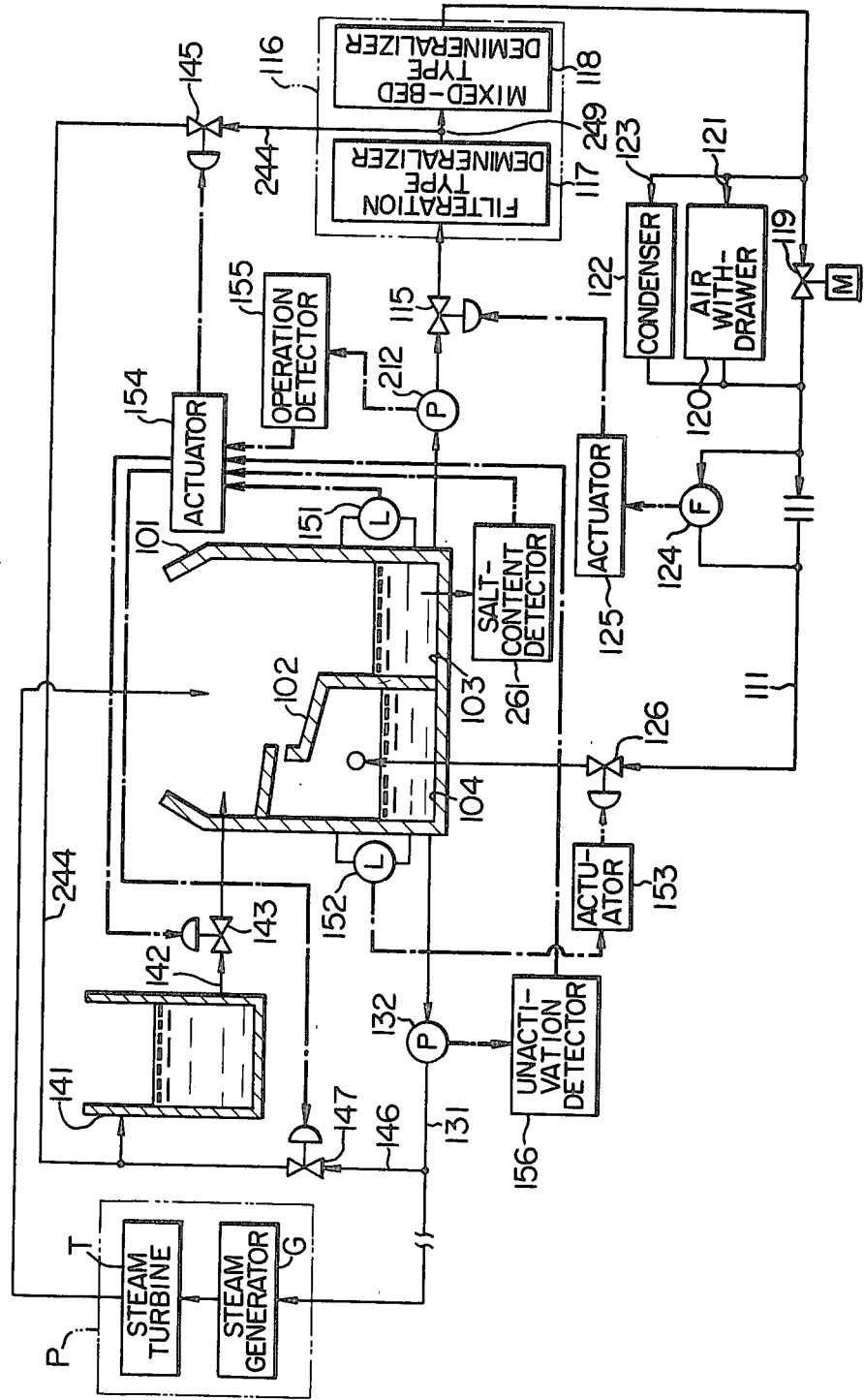
FIG. 3 is a schematic view of a condensation system comprising another embodiment of the present invention.

Referring to FIG. 3 there is illustrated a condensation system comprising a second embodiment of the present invention. In the embodiment in FIG. 3, same reference numerals are applied to parts and portions common to the embodiment in FIG. 2, and descriptions of the common parts and portions will be omitted to avoid repetition.

The embodiment in FIG. 3 is different from the embodiment in FIG. 2 in that a condensate pump 212 provided in a condensate feed line 111 is lower in capacity than the pumping apparatus 112 in FIG. 2; and a first spill-over line 244 is connected to the condensate feed line 111 at a location 249 downstream of a filtration type demineralizer 117 and upstream of a mixed-bed type demineralizer 118 of a condensate purifying apparatus 116. Pressure loss at the mixed-bed type demineralizer 118 is very high. Therefore, the first spill-over line 244 is connected to the condensate feed line 111 at the location 249. With the arrangement, capacity of the condensate pump 212 can be lowered.

However, should a great amount of cooling seawater be inadvertently introduced into the first hot well 103, for example, when cooling pipes or pipe plates are broken, insufficiently purified condensate will be introduced into a tank 141 through the first spill-over line 244, because the condensate fed through the first spill-over line 244 is not purified by the mixed-bed type demineralizer 118. To cope with such situation, the embodiment illustrated in FIG. 3 comprises a salt-content detector 261 for detecting salt-content of condensate in the first hot well 103 to produce a signal when the salt-content of condensate in the first hot well 103 exceeds a predetermined value. The signal from the detector 261 is supplied to a second actuator 154 to cause the same to actuate the first and second spill-over valves 145 and 147 so as to close the first spill-over valve 145 and so as to open the second spill-over valve 147 to regulate opening degree thereof so that sufficiently purified condensate is introduced into the tank 141 through a second spill-over line 147.

Figure 4:
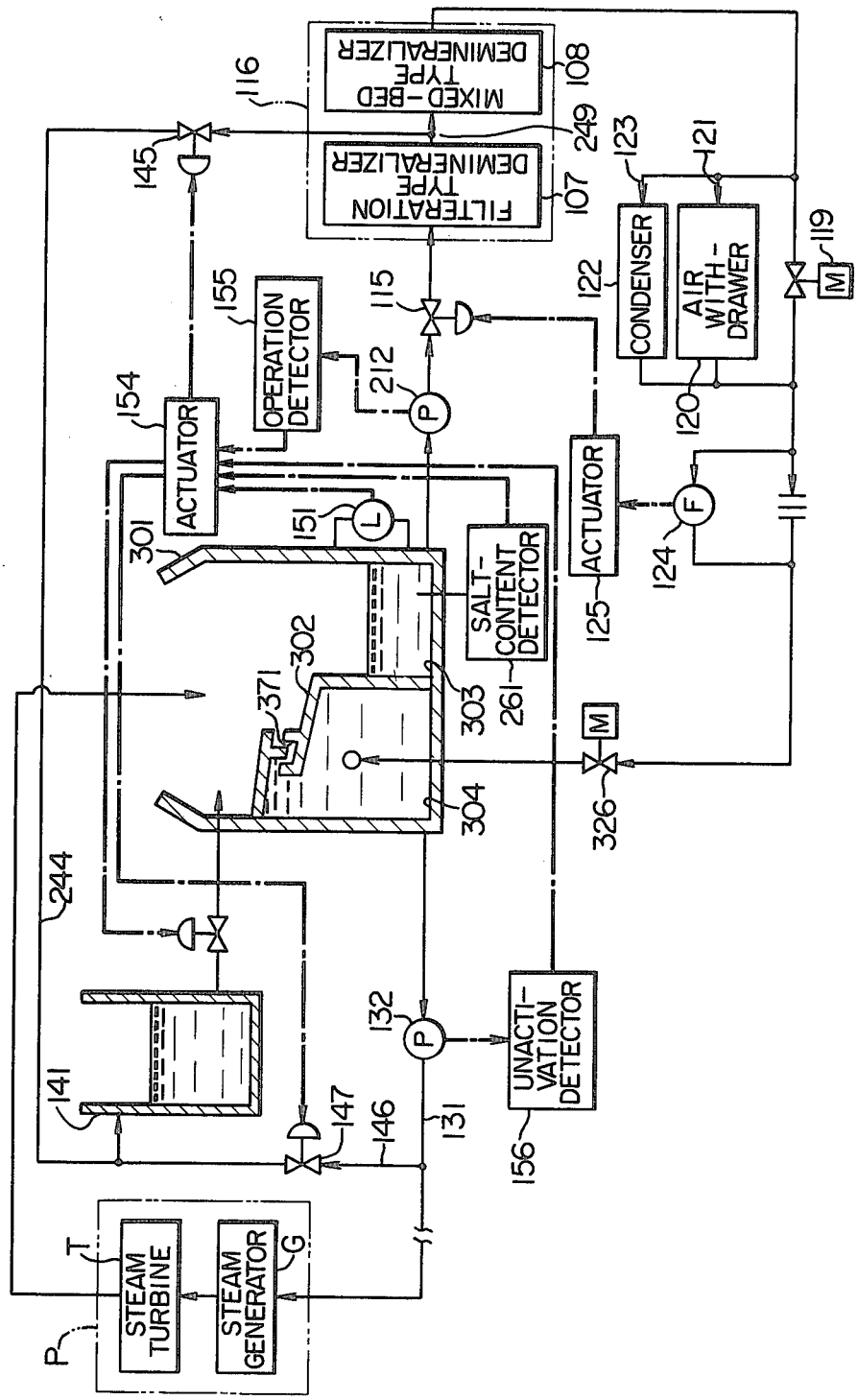
FIG. 4 is a schematic view of a condensation system comprising still another embodiment of the present invention.

FIG. 4 shows a third embodiment of the present invention. In the embodiment in FIG. 4, the same reference numerals are applied to parts and portions common to the embodiment in FIG. 3, and description of the common parts and portions will be omitted to avoid repetition.

The embodiment in FIG. 4 differs from the embodiment in FIG. 3 in that a side stream condenser 301 includes a partition wall 302 defining a first and second hot wells 303 and 304 and having a labyrinth passage 371 through which condensate in the second hot well 304 passes into the first hot well 303 at a constant flow rate, as far as a condensate pump 212 is activated; and no level detector is associated with the second hot well 304. A motor-actuated flow control valve 326 provided in a condensate feed line 111 is preset to have a predetermined opening degree to allow condensate to be supplied into the second hot well 304 at a constant flow rate.

The second hot well 304 is fully filled with condensate, and the valve 326 is preset to have such opening degree that a portion of condensate is continuously returned into the first hot well 303 through the labyrinth passage 371, during supply of condensate into a power plant P through a main condensate feed line 131. With the arrangement, change in amount of condensate supplied to the power plant P through the main condensate feed line 131 does merely cause change in flow rate of condensate returned into the first hot well 303 through the labyrinth passage 371. Thus, control of level of condensate is not required for the second hot well 304.

What we claim is:
1. A condensation system for use in a power plant including a steam generator and a steam turbine, comprising;
a side stream condenser defining therein first and second hot wells, said first hot well receiving therein condensate produced by condensing steam exhausted from said steam turbine;

a condensate purfication system including a condensate feed line through which condensate is fed from said first hot well to said second hot well, and means provided in said condensate feed line for purifying condensate flowing therethrough;

a main feed system including a main condensate line through which condensate is fed from said second hot well to said steam generator;

a supplementary feed system including a condensate tank, a supplementary feed line having one end thereof connected to said tank and the other end connected to said first hot well, a supplementary feed valve provided in said supplementary feed line for controlling flow rate of condensate from said tank to said first hot well, a first spill-over line having one end thereof connected to said tank and the other end connected to said condensate feed line, a first spill-over valve provided in said first spill-over line for controlling flow rate of condensate from said condensate feed line to said tank, a second spill-over line having one end thereof connected to said tank and the other end connected to said main condensate feed line, and a second spill-over valve provided in said second spill-over line for controlling flow rate of condensate from said main condensate feed line to said tank; and a control system including level detecting means for detecting level of condensate in said first hot well to produce a signal, and actuating means operative in response to the signal from said level detecting means to actuate said supplementary feed valve and said first and second spill-over valves so as to regulate the opening degree of said supplementary feed valve, so as to open one of said first and second spill-over valves to regulate the opening degree thereof, and so as to close the other spill-over valve.

2. A condensation system defined in claim 1, wherein said actuating means normally opens said first spill-over valve so as to regulate opening degree thereof and normally closes said second spill-over valve.

3. A condensation system defined in claim 2, wherein said main feed system further includes a main condensate pump provided in said main condensate line for pumping condensate from said second hot well to said steam generator, said the other end of said second spill-over line being connected to said main condensate line at a location downstream of said main condensate pump, and wherein said control system further includes unactivation detecting means for detecting activation and unactivation of said main condensate pump to produce a signal when said main condensate pump is unactivated, said actuating means being operative in response to the signal from said unactivation detecting means to fully open said first spill-over valve.

4. A condensation system as defined in claim 1, 2, or 3, wherein said condensation purification system further includes means provided in said condensate feed line upstream of said purifying means for pumping condensate from said first hot well to flow through said condensate feed line, and wherein said level control system further includes condition detecting means detecting an operating condition of said pumping means to produce a signal indicating at least one of a first condition when said pumping means starts its operation and a second condition when said pumping means decreases in its capacity, said actuating means operative in response to the signal from said condition detecting means to close said first spill-over valve and to open said second spill-over valve so as to regulate opening degree thereof.

5. A condensation system defined in claim 4, wherein said purifying means includes a filteration type demineralizer and a mixed-bed type demineralizer connected thereto in series and downstream thereof.

6. A condensation system defined in claim 5, wherein said other end of said first spill-over line is connected to said condensate feed line at a location downstream of said filtration type demineralizer.

7. A condensation system defined in claim 6, wherein said condensate purification system further includes a flow control valve provided in said condensate feed line at a location downstream of the location where said the other end of said first spill-over line is connected to said condensate feed line for controlling flow rate of condensate fed into said second hot well, second level detecting means for detecting level of condensate in said second hot well to produce a signal, and second actuating means operative in response to the signal from said second level detecting means to actuate said flow control valve so as to regulate the opening degree thereof.

8. A condensation system defined in claim 7, wherein said condensate purification system further includes a second flow control valve provided in said condensate feed line downstream of said pumping means and upstream of said purifying means for controlling flow rate of condensate passing through said purifying means, a flow rate detector for detecting flow rate of condensate flowing through said condensate feed line at a location downstream of the location where said the other end of first spill-over line is connected to said condensate feed line and upstream of said first-mentioned flow control valve, and third actuating means operative in response to the signal from said flow detecting means to actuate said second flow control valve so as to regulate the opening degree thereof.

9. A condensation system defined in claim 8, wherein said condensate purification system further includes a third flow control valve provided in said condensate feed line at a location upstream of said flow rate detecting means and downstream of the location where said the other end of said first spill-over line is connected to said condensate feed line, a gland steam condenser provided in a bypass line bypassing said third flow control valve for condensing steam enclosed within a gland portion of said steam turbine, and an air withdrawer provided in a bypass line bypassing said third flow control valve and said gland steam condenser for condensing steam utilized to withdraw incondensable gas out of said side stream condenser.

10. A condensation system defined in claim 5, wherein said other end of said first spill-over line is connected to said condensate feed line at a location downstream of said filtration type demineralizer and upstream of said mixed-bed type demineralizer.

11. A condensation system defined in claim 10, wherein said control system further includes salt-content detecting means for detecting salt content of the condensate in said first hot well to produce a signal when the salt content exceeds a predetermined value, said actuating means being operative in response to the signal from said salt-content detecting means to actuate said first and second spill-over valves so as to close said first spill-over valve and to open said second spill-over valve to regulate the opening degree thereof.

12. A condensation system defined in claim 11, wherein said condensate purification system further includes a flow control valve provided in said condensate feed line at a location downstream of said mixed-bed type demineralizer for controlling flow rate of condensate fed into said second hot well, second level detecting means for detecting level of condensate in said second hot well to produce a signal, and second actuating means operative in response to the signal from said second level detecting means to actuate said flow control valve so as to regulate the opening degree thereof.

13. A condensation system defined in claim 12, wherein said condensation purification system further includes a second flow control valve provided in said condensate feed line downstream of said pumping means and upstream of said purifying means for controlling flow rate of condensate passing through said purifying means, a flow rate detector for detecting flow rate of condensate flowing through said condensate feed line at a location downstream of said mixed-bed type demineralizer and upstream of said first-mentioned flow control valve, and third actuating means operative in response to the signal from said flow detecting means to actuate said second flow control valve so as to regulate the opening degree thereof.

14. A condensation system defined in claim 13, wherein said condensation purification system further includes a third flow control valve provided in said condensate feed line at a location upstream of said flow rate detecting means and downstream of said mixed-bed type demineralizer, a gland steam condenser provided in a bypass line bypassing said third flow control valve for condensing steam enclosed within a gland portion of said steam turbine, and an air withdrawer provided in a bypass line bypassing said third flow control valve and said gland steam condenser for condensing steam utilized to withdraw incondensable gas out of said side stream condenser.

15. A condensation system defined in claim 11, wherein said condensate purification system further includes a flow control valve provided in said condensate feed line at a location downstream of said mixed-bed type demineralizer, said flow control valve having a preset opening degree thereof to allow a predetermined flow rate of condensate to be fed into said second hot well, and wherein said side stream condenser further includes a labyrinth passage communicating said second hot well with said first hot well, said second hot well being fully filled with condensate to continuously feed the condensate from said second hot well to said first hot well through said labyrinth passage.

16. A condensation system defined in claim 15, wherein said condensation purification systme further includes a second flow control valve provided in said condensate feed line downstream of said pumping means and upstream of said purifying means for controlling flow rate of condensate passing through said purifying means, a flow rate detector for detecting flow rate of condensate flowing through said condensate feed line at a location downstream of the location where said the other end of first spill-over line is connected to said condensate feed line and upstream of said first-mentioned flow control valve, and third actuating means operative in response to the signal from said flow detecting means to actuate said second flow control valve so as to regulate the opening degree thereof.

17. A condensation system defined in claim 16, wherein said condensation purification system further includes a third flow control valve provided in said condensate feed line at a location upstream of said flow rate detecting means and downstream of the location where said the other end of said first spill-over line is connected to said condensation feed line, a gland steam condenser provided in a bypass line bypassing said third flow control valve for condensing steam enclosed within a gland portion of said steam turbine, and an air withdrawer provided in a bypass line bypassing said third flow control valve and said gland steam condenser for condensing steam utilized to withdraw incondensable gas out of said side stream condenser.

18. A condensation system defined in claim 9, wherein said other end of said first spill-over line is connected to said condensate feed line at a location downstream of said mixed-bed type demineralizer.

* * * * *